(12) United States Patent
Jacobs

(10) Patent No.: US 7,724,511 B2
(45) Date of Patent: May 25, 2010

(54) ADJUSTABLE DISPLAY SCREEN FOR A LAPTOP COMPUTER

(76) Inventor: Matthew B. Jacobs, 7979 Pinnacle Peak Ave., Las Vegas, NV (US) 89113

( * ) Notice: Subject to any disclaimer, the term of this patent is extended or adjusted under 35 U.S.C. 154(b) by 343 days.

(21) Appl. No.: 11/681,485

(22) Filed: Mar. 2, 2007

(65) Prior Publication Data

US 2007/0206349 A1 Sep. 6, 2007

Related U.S. Application Data

(60) Provisional application No. 60/778,425, filed on Mar. 3, 2006.

(51) Int. Cl.
*H05K 5/00* (2006.01)
*H05K 7/00* (2006.01)
(52) U.S. Cl. .................. 361/679.27; 361/679.26; 361/679.21; 361/679.05
(58) Field of Classification Search .......... 361/683, 361/679.26, 679.27, 679.05, 679.21–679.3
See application file for complete search history.

(56) References Cited

U.S. PATENT DOCUMENTS

| 5,173,837 | A |   | 12/1992 | Blackwell et al. |         |
|-----------|---|---|---------|------------------|---------|
| 5,229,920 | A |   | 7/1993  | Spaniol et al.   |         |
| 5,237,488 | A | * | 8/1993  | Moser et al.     | 361/681 |
| 5,494,447 | A | * | 2/1996  | Zaidan           | 439/31  |
| 5,752,292 | A |   | 5/1998  | Rachel           |         |
| 5,897,382 | A | * | 4/1999  | Takahashi        | 439/31  |
| 5,910,883 | A |   | 6/1999  | Cipolla et al.   |         |
| 6,016,171 | A | * | 1/2000  | Tsao             | 348/836 |
| 6,076,787 | A |   | 6/2000  | Troyer           |         |
| 6,198,624 | B1 |  | 3/2001  | Margaritis       |         |
| 6,233,138 | B1 | * | 5/2001  | Osgood           | 361/679.05 |
| 6,295,038 | B1 | * | 9/2001  | Rebeske          | 345/1.1 |
| 6,315,252 | B1 |  | 11/2001 | Schultz          |         |
| 6,381,125 | B1 |  | 4/2002  | Mizoguchi et al. |         |
| 6,392,877 | B1 | * | 5/2002  | Iredale          | 361/683 |
| 6,430,038 | B1 | * | 8/2002  | Helot et al.     | 361/681 |
| 6,665,175 | B1 | * | 12/2003 | deBoer et al.    | 361/681 |
| 6,666,422 | B1 |  | 12/2003 | Lu et al.        |         |
| 6,701,851 | B2 |  | 3/2004  | Ibrahim          |         |
| 6,804,859 | B2 |  | 10/2004 | Lu et al.        |         |
| 6,813,813 | B2 |  | 11/2004 | Lu et al.        |         |

(Continued)

FOREIGN PATENT DOCUMENTS

JP 06046488 2/1994

(Continued)

OTHER PUBLICATIONS www.flybook.biz; internet web page dated Jan. 11, 2007.

*Primary Examiner*—Jayprakash N Gandhi
*Assistant Examiner*—Anthony M Haughton
(74) *Attorney, Agent, or Firm*—Whitham Curtis Christofferson & Cook, PC

(57) ABSTRACT

A laptop computer display screen is adjustable to a user's convenience by constructing an adjustable angle instead of rigidly connecting the display screen to an extender mechanism via which the screen is vertically extended upwards away from the laptop body. An adjustable angle between the extended display screen and the extender mechanism may be established via a tilt-hinge, making the angle between the display screen and the extender mechanism easily adjustable by a user.

1 Claim, 6 Drawing Sheets

U.S. PATENT DOCUMENTS

| | | |
|---|---|---|
| 6,816,365 B2 * | 11/2004 | Hill et al. .................... 361/681 |
| 6,826,041 B2 | 11/2004 | Yu |
| 6,988,294 B2 * | 1/2006 | Birtley ........................ 16/342 |
| 7,007,612 B2 | 3/2006 | Mallory et al. |
| 7,035,090 B2 * | 4/2006 | Tanaka et al. ................ 361/681 |
| 7,035,100 B2 | 4/2006 | Lord |
| 7,127,776 B2 * | 10/2006 | Park ........................... 16/239 |
| 7,159,771 B2 | 1/2007 | Singgih et al. |
| 7,168,665 B2 | 1/2007 | Hong et al. |
| 7,177,144 B2 | 2/2007 | Ha et al. |
| 7,251,128 B2 * | 7/2007 | Williams et al. ............ 361/683 |
| 7,342,777 B2 * | 3/2008 | Chen ........................... 361/681 |
| 7,492,580 B2 | 2/2009 | Lee |
| 2003/0103324 A1 * | 6/2003 | Gallivan ...................... 361/681 |
| 2004/0228077 A1 | 11/2004 | Hall et al. |
| 2005/0206615 A1 * | 9/2005 | Tanimoto et al. ............. 345/156 |
| 2005/0274852 A1 | 12/2005 | Saez et al. |
| 2006/0017753 A1 | 1/2006 | Ferrucei |
| 2008/0174943 A1 * | 7/2008 | Hirasawa et al. ............ 361/681 |

FOREIGN PATENT DOCUMENTS

| | | |
|---|---|---|
| JP | 7234743 A2 | 9/1995 |

* cited by examiner

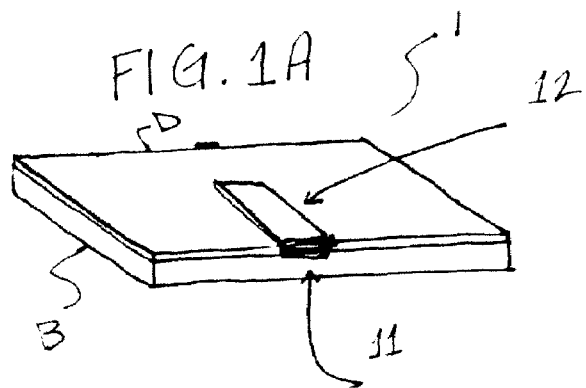
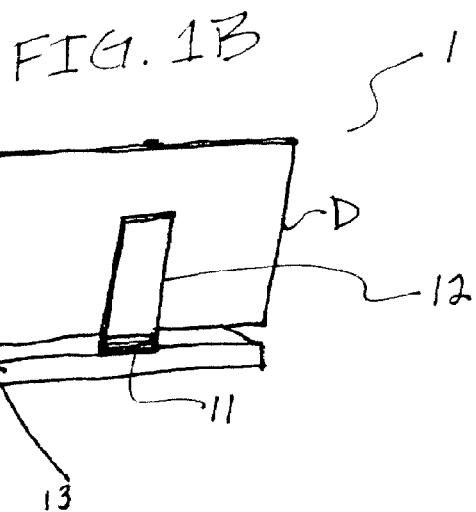
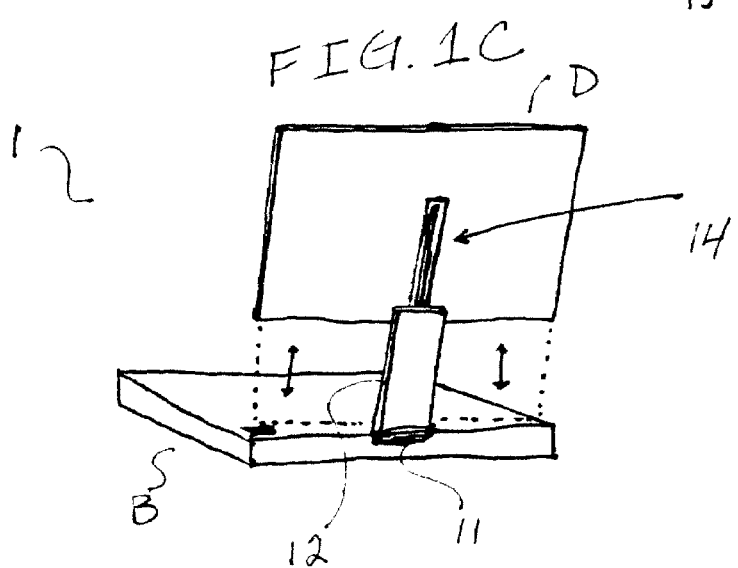

ADJUSTABLE DISPLAY SCREEN FOR A LAPTOP COMPUTER

RELATED APPLICATION

This application claims benefit of U.S. provisional application Ser. No. 60/778,425 filed Mar. 3, 2006.

FIELD OF THE INVENTION

The present invention generally relates to laptop computers, and more particularly to the display screens of laptop computers.

BACKGROUND OF THE INVENTION

Various display screens, supports, and other mechanisms for laptop computers are known. As may be appreciated, laptop computers present some additional and different challenges not necessarily encountered for non-laptop computers. While laptop computers offer the advantage of portability, laptop computers are not without drawbacks. A problem with laptop computers is that the adjustability of display screens so that users of various proportions in various settings each may view the screens comfortably is relatively limited.

The following patent literature, not necessarily limited to laptop computers, is mentioned:

U.S. Pat. No. 5,173,837 issued Dec. 22, 1992 to Blackwell et al. (Compaq Computer Corp.), for "Hinge with two-towed clutch spring for suppressing electromagnetic interference for laptop personal computers."

U.S. Pat. No. 5,229,920 issued Jul. 20, 1993 to Spaniol et al. (TA Triumph-Adler AG), for "Portable data processing device with turnable and telescopable display."

JP 7234743A2 published 1995-09-05, by Hideo (Funai Electric Co. Ltd.), for "Data processor."

U.S. Pat. No. 5,752,292 issued May 19, 1998 to Rachel for "Laptop computer hinge reinforcing apparatus."

U.S. Pat. No. 5,910,883 issued Jun. 8, 1999 to Cipolla et al. (International Business Machines Corp.), for "Hinge incorporating a helically coiled heat pipe for a laptop computer."

U.S. Pat. No. 6,076,787 issued Jun. 20, 2000 to Troyer (LapStand, Inc.), for "Portable stand for laptop computers."

U.S. Pat. No. 6,198,624 issued Mar. 6, 2001 to Margaritis, for "Ergonomic laptop display positioning supports."

U.S. Pat. No. 6,233,138 issued May 15, 2001 to Osgood (Evergreen Innovations, LLC), for "Telescoping pivot hinge for computer display."

U.S. Pat. No. 6,315,252 issued Nov. 13, 2001 to Schultz, for "Removably mounted computer stand for automobiles and the like."

U.S. Pat. No. 6,381,124 issued Apr. 30, 2002 to Mizoguchi et al. (Toshiba), for "Personal computer."

U.S. Pat. No. 6,666,422 issued Dec. 23, 2003 to Lu et al. (Shin Zu Shing Co., Ltd.), for "Foldable hinge bracket for a laptop computer."

U.S. Pat. No. 6,701,851 issued Mar. 9, 2004 to Ibrahim, for "Stand for reading materials and laptop computers."

U.S. Pat. No. 6,804,859 issued Oct. 19, 2004 to Lu et al. (Shin Zu Shing Co., Ltd.), for "Securing device for a laptop computer hinge to avoid damping of a screen when the screen is away from mainframe of the laptop computer."

U.S. Pat. No. 6,813,813 issued Nov. 9, 2004 to Lu et al. (Shin Zu Shing Co., Ltd.), for "Collapsible hinge bracket for a laptop computer."

U.S. Pat. Pub. No. 2004/0228077 published Nov. 18, 2004 by Hall et al., for "Height adjustable computer monitor and document holder."

U.S. Pat. No. 6,826,041 issued Nov. 30, 2004 by Yu, for "Dynamic angle computer monitor."

U.S. Pat. Pub. No. 2005/0274852 published Dec. 15, 2005 by Saez et al. (Humanscale Corp.), for "Laptop holder."

U.S. Pat. Pub. No. 2006/0017753 published Jan. 26, 2006 by Ferrucei for "Computer laptop flip and lift apparatus."

U.S. Pat. No. 7,007,612 issued Mar. 7, 2006 by Mallory et al., for "Laptop computer support system."

U.S. Pat. No. 7,035,100 issued Apr. 25, 2006 by Lord (Hotwire Development LLC), for "Universal portable computer stand and high speed connectivity center."

U.S. Pat. No. 7,159,771 issued Jan. 9, 2007 to Singgih et al. (Pioneer Pos Inc.), for "Information processing terminal with adjustable and foldable support stand."

U.S. Pat. No. 7,168,665 issued Jan. 30, 2007 to Hong et al. (Samsung Electronics Co., Ltd.), for "Display apparatus."

U.S. Pat. No. 7,177,144 issued Feb. 13, 2007 to Ha et al. (Samsung), for "Tilting apparatus of monitor."

SUMMARY OF THE INVENTION

The present inventor has especially considered the problem of the inconvenience and lack of adjustability of laptop computer display screens. Inventively, a laptop computer display screen is adjustable to a user's convenience by constructing an adjustable angle instead of rigidly connecting the display screen to an extender mechanism via which the screen is vertically extended upwards away from the laptop body. An adjustable angle between the extended display screen and the extender mechanism may be established via a tilt-hinge, making the angle between the display screen and the extender mechanism easily manually-adjustable by a user.

The invention in one preferred embodiment provides an adjustment method for a laptop computer having an extendable display attached to the laptop body via an extender mechanism, comprising: adjusting an angle formed where the display attaches to the extender mechanism, such as, e.g., an inventive adjustment method wherein the display is attached to the extender mechanism via a tilt-hinge and the adjusting step comprises operating the tilt-hinge; and other inventive methods.

In another preferred embodiment, the invention provides a laptop computer with an adjustable display, comprising: a laptop body; an extendible display electrically connected to the laptop body; an extender mechanism mechanically attaching the display to the laptop body; further comprising an angle formed where the extendible display in an extended position attaches to the extender mechanism, the angle being adjustable by a user in normal operation; such as, e.g., an inventive laptop computer comprising at least one tilt-hinge located at the angle; and other inventive laptop computers.

In a further preferred embodiment, the invention provides a display-adjusting assembly for a laptop computer comprising: an angle-able display which is vertically moveable along an extension axis, the extension axis having a minimum position at which the display is unextended and further having at least one extended position; an extender mechanism on which, via which and/or due to which the display vertically moves along the extension axis; the extender mechanism and the display in an extended position establishing an angle; an angle adjustment mechanism (such as, e.g., an angle adjustment mechanism comprising at least one tilt-hinge (such as, e.g., a tilt-hinge comprising a first end and a second end, the first end being attached to the display and the second end being attached to the extender mechanism)), the angle between the extender mechanism and the display in an extended position being adjustable via operation of the angle adjustment mechanism; such as, e.g.: an inventive display-adjusting assembly comprising a display that is slideably raisable and lowerable and held by at least one guide-rail; each guide-rail having attached thereto a pivot-hinge having a first end at which the pivot-hinge is attached to the guide-rail and a second end at which the pivot-hinge is attachable or attached to a laptop body; an electrical connection between the display and the laptop body (such as, e.g., an electrical connection that comprises at least one metallic contact point disposed within the at least one guide-rail, and the display assembly contains no retracting cable; etc.), said electrical connection being disposed within the at least one guide-rail; and at least one button depressable by a user (such as, e.g., a button depression of which renders the display slideable and release of which renders the display non-slidable; a button that controls a mechanism comprising a spring or a low-pressure pneumatic device; a button located on the laptop body; a button located on the display; etc.), depression of the button rendering the display slideable relative to the laptop body and/or rendering the laptop body horizontally slideable in a plane in which the laptop body sits; an inventive display-adjusting assembly wherein the at least one guide-rail consists of one central guide-rail; an inventive display-adjusting assembly wherein the at least one guide-rail comprises a pair of guide-rails; an inventive display-adjusting assembly comprising two buttons including a first button controlling slideability of the display relative to the laptop body and a second button controlling horizontal moveability of the laptop body; an inventive display-adjusting assembly comprising an automated slide mechanism activated by change in a status of a position of the display as being in an open-for-use position or a closed position (such as, e.g., an automated slide mechanism that comprises an automatic opener activated by change in the status of the display from a closed position to an open-for-use position and/or an automatic closer activated by change in the status of the display from an open-for-use position to a closed position); an inventive display-adjusting assembly wherein the angle adjustment mechanism comprises at least one pivot hinge or tilt hinge, and wherein the display in addition to being slideable along the z-axis via at least one guide-rail further is moveable in fore and aft movement via the at least one pivot hinge or tilt hinge; an inventive display-adjusting assembly comprising at least one button-activated telescoping assembly, the telescoping assembly moving the display relative to the laptop body, the laptop body having a relatively fixed position while the display moves; an inventive display-adjusting assembly comprising at least one button-activated telescoping assembly, the telescoping assembly moving the laptop body horizontally; and other inventive display-adjusting mechanisms.

BRIEF DESCRIPTION OF THE DRAWINGS

The invention may be further appreciated with reference to the figures, without the invention being limited to the figures.

FIGS. 1A-1E depict an inventive embodiment, the laptop computer 1 being: closed in FIG. 1A; opened with display screen unextended in FIG. 1B; opened with display screen extended in FIG. 1C; opened with display screen extended and tilted relative to the laptop body in FIG. 1D; and in process of being closed but not fully closed in FIG. 1E.

DETAILED DESCRIPTION OF A PREFERRED EMBODIMENT OF THE INVENTION

Referring to FIGS. 1A-3E, the invention provides various laptop computers (such as laptop computers 1, 2, 3) having height adjustable displays.

Figure 1D:
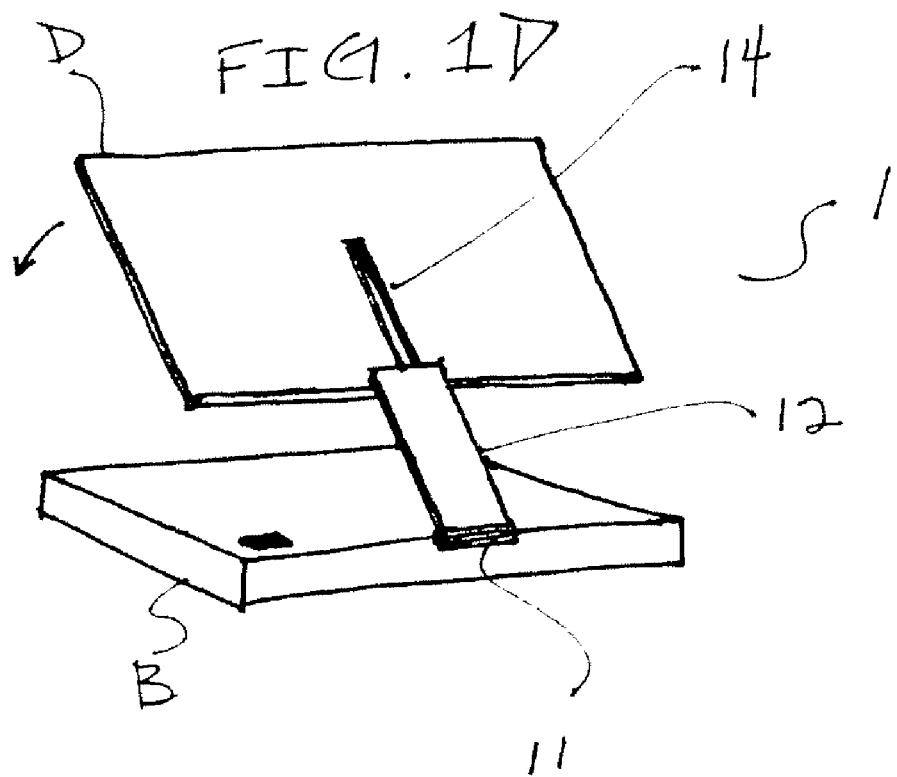

Referring to FIGS. 1A-1E, an inventive laptop computer 1 comprises a pivot hinge 11 and a guide rail enclosure 12. Pivot hinge 11 attaches the laptop body B to the guide rail enclosure 12. In FIG. 1A, the laptop computer 1 is in a closed state (there being no angle between laptop body B and display screen D). An example of a "display" (also called "display screen"), is, e.g., an LCD display.

It will be appreciated that the use of pivot hinge 11 for connecting the guide rail enclosure 12 to the laptop body B permits opening of the laptop 1, and also makes the display D angleable with respect to the laptop body B by the user's adjusting the angle formed by the guide rail enclosure 12 and the laptop body B (with such angle adjustment preferably being accomplished by the user manually moving the display D while the body B remains set on a work surface (not shown)). In FIG. 1B, the laptop computer 1 has been opened, i.e., there is a non-zero angle between laptop body B and display screen D.

Referring to the guide rail enclosure 12, preferably the guide rail enclosure comprises a retractable VGA/power cable enclosed therein.

There is provided a control 13 for adjustment of the display screen D. In FIG. 1B, the control 13 is shown as a button and is shown on the laptop body B, but it should be appreciated that the control 13 is not required in all inventive embodiments to a button nor to be positioned on the laptop body B; moreover that when the button 13 is positioned on the laptop body B the button need not be in the particular location illustrated.

In FIG. 1C, the display screen D has been extended and guide rail 14 is extended from guide rail enclosure 12. Preferably the guide rail 14 is so extended by a user of the laptop computer 1 manually sliding the guide rail 14 to extend beyond the guide rail enclosure 12. The display D is attached to the guide rail 14 which supports the display D when the display D is in a position extended away from the laptop body B. The guide rail 14 is attached to the display D.

As may be seen in FIGS. 1C-1D, the display D in a position extended away from the laptop body B is angleable with respect to the laptop body B by the user's adjusting the angle formed by the guide rail enclosure 12 and the laptop body B (with such angle adjustment preferably being accomplished by the user manually moving the display D while the body B remains set on a work surface (not shown)).

Figure 1E:
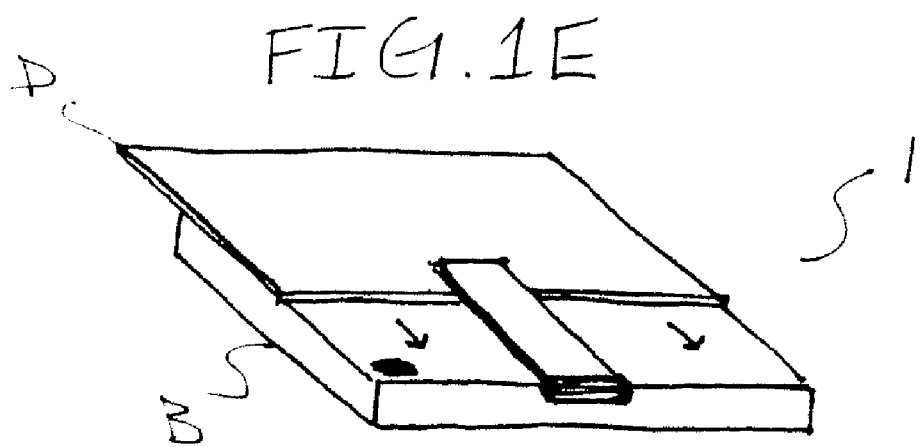

A preferred way of closing the laptop computer 1 is shown with references to FIGS. 1D-1E. The user pushes the extended display D (FIG. 1D) so that the guide rail 14 is received back into the guide rail enclosure 12.

Figure 2:
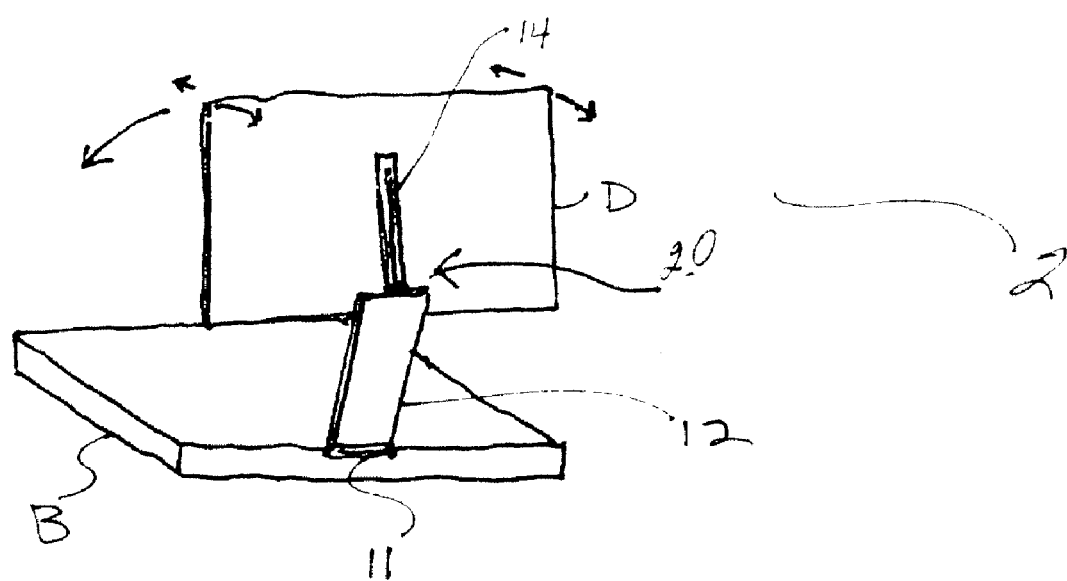
FIGS. 2-2C depict an inventive embodiment of a laptop computer having a display screen angleable with respect to the laptop body via a tilt hinge 20.
Figure 2A:
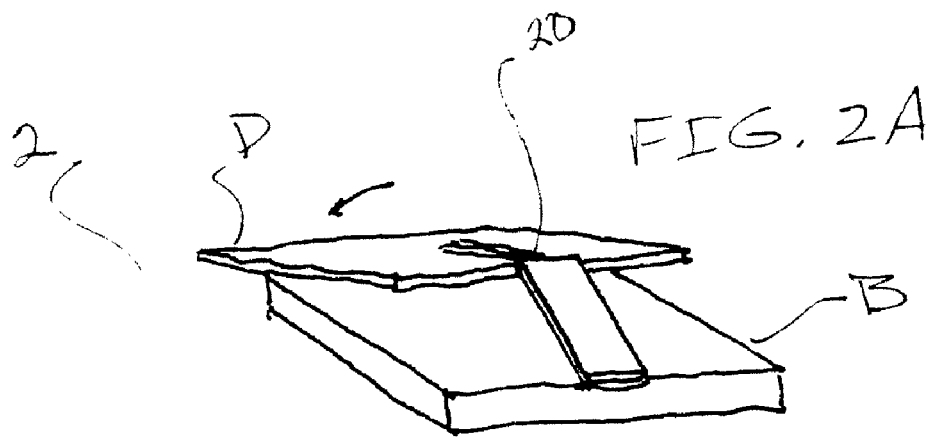
Figure 2B:
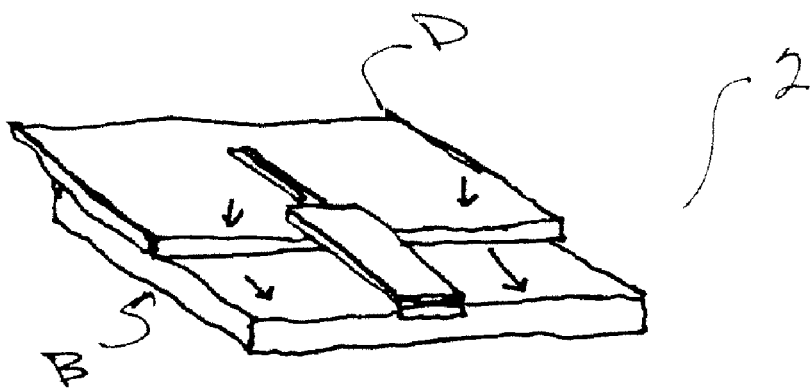
Figure 2C:
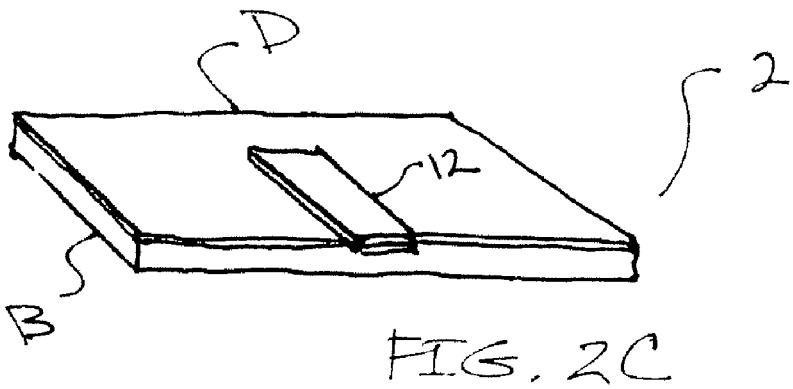

Referring to FIGS. 2-2C, laptop computer 2 may be according to laptop computer 1 (FIGS. 1A-1E), further provided that laptop computer 2 comprises a pivot hinge 20 disposed between the guide rail 14 and the guide rail enclosure 12. Through a user's operation of pivot hinge 20 (such as by the user's manually moving the display D while the laptop body B remains relatively stationary on a work surface (not shown)), a user may adjust the angle of the display D relative to the laptop body B to achieve a desired position of the display D. The user of a laptop computer 2 comprising a pivot hinge 20 between the guide rail 14 and the guide rail enclosure 12 therefore can readily angle the display screen D preferably by doing so manually, without needing any tool.

A "pivot hinge" mentioned herein refers to hardware that is known by that name in the mechanical arts.

When the inventor sometimes refers to a "secondary pivot hinge," he is referring to a pivot hinge joining the guide rail 14 and the guide rail enclosure 12 (as opposed to a pivot hinge joining the guide rail enclosure 12 and the laptop body B.

A further example of the angleability of the display D in the laptop computer 2 comprising pivot hinge 20 is shown in FIG. 2A. The laptop computer 2 comprising pivot hinge 20 may be closed as shown in FIGS. 2B-2C.

Figure 3:
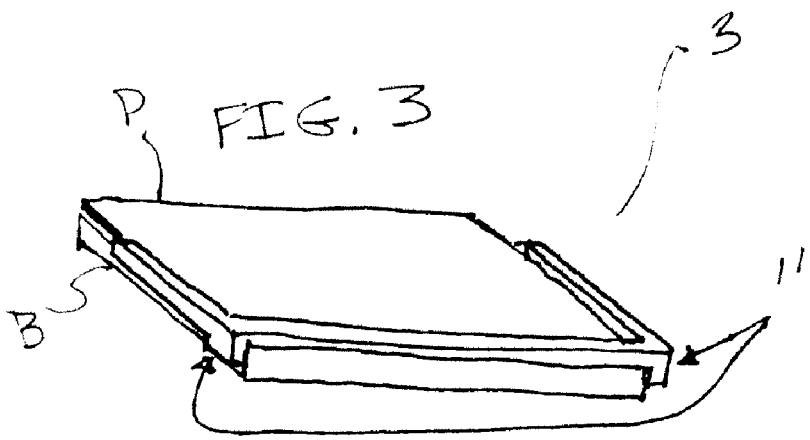
FIGS. 3-3E depict an inventive embodiment of a laptop computer having dual guide rails.
Figure 3A:
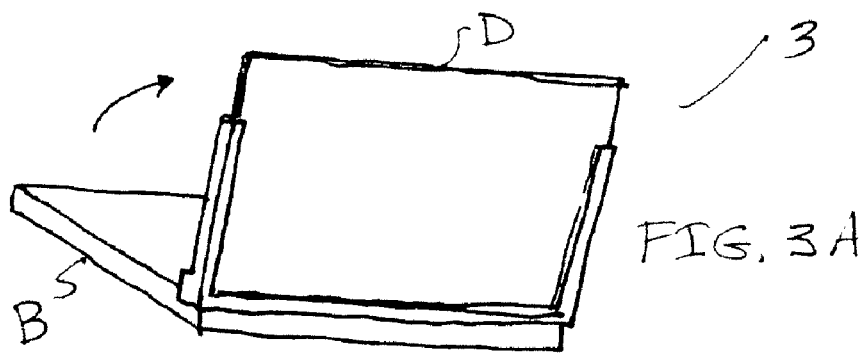
Figure 3B:
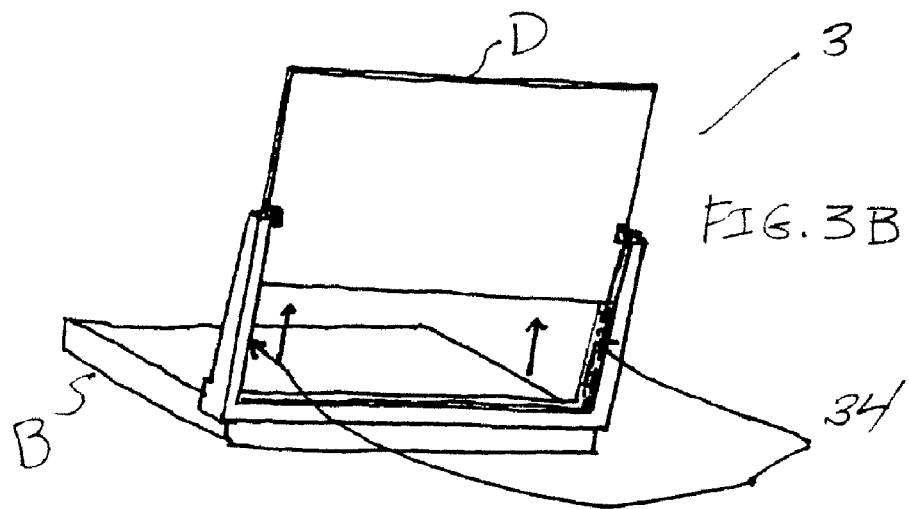
Figure 3C:
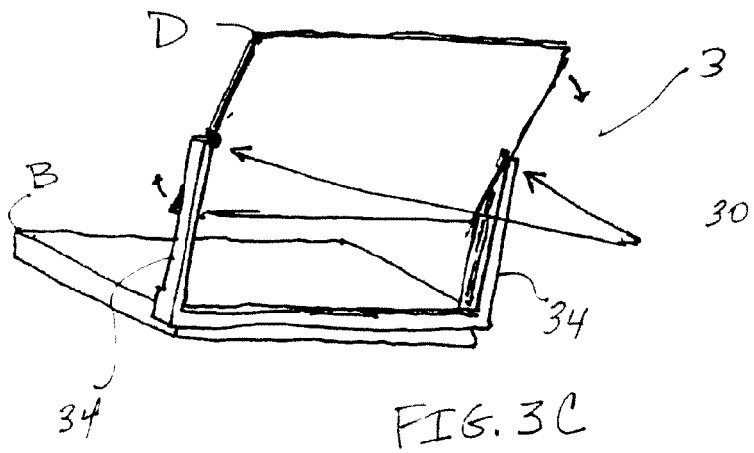

In FIGS. 1A-2C, there is illustrated a single guide rail enclosure 12 with single guide rail 14. It should be appreciated that at least one guide rail 14 and guide rail enclosure 12 are intended. A dual-rail inventive embodiment of a laptop computer 3 may be constructed and used as shown in FIGS. 3-3E. Similar part numbering is used for discussing FIGS. 3-3E as for FIGS. 1A-2C. Referring to the dual-rail laptop computer 3 in FIGS. 3-3E, pivot hinges 11 are attached to the laptop body B. In FIG. 3, the laptop computer 3 is closed, and is opened via operation of the pivot hinges 11 to an open position (FIG. 3A). Using guide rails 34, the display D is extendible away from the laptop body B into an extended-out position (FIG. 3B). Referring to FIG. 3C, secondary tilt hinges 30 are disposed between respective guide rails 34 and the display D, whereby the display D is angleable with respect to the laptop body B (preferably by a user's manually moving the display D such as by holding in one hand a guide rail 34 and with the other hand moving the display D).

Figure 3D:
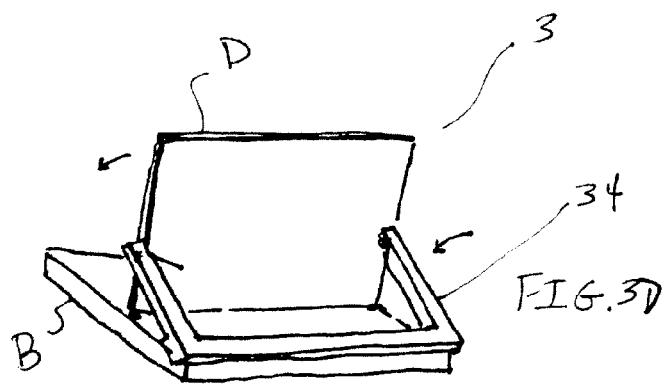
Figure 3E:
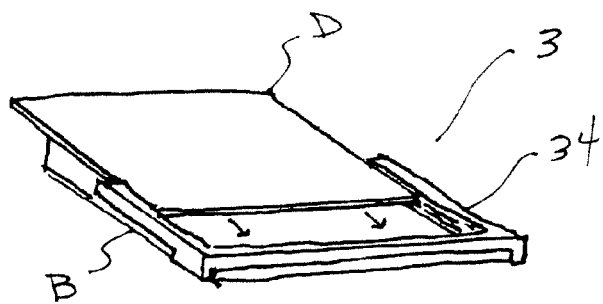

The laptop computer 3 may be closed as shown in FIGS. 3D-3E.

In the present invention, by providing at least one secondary hinge that is adjustable not just at the computer body B, but at the juncture of the display screen D and the extender, there is provided not just slide and pitch, but tilt for the display screen D of a laptop computer.

The inventive slide-up laptop display is ideal for mobile users who desire the comfort of an adjustable-height display but who do not have an external monitor available (i.e., frequent travelers).

EXAMPLE 1

This inventive example is a laptop computer (such as laptop computer 1 in FIGS. 1A-1E) with a slide-up display that allows users to raise the display to a comfortable height. The display is held by a central guide-rail which contains a button-controlled height adjustor using either a spring or a low-pressure pneumatic device. The guide-rail is attached by a pivot-hinge to the laptop body. A retractable ribbon type flex-cable (transmitting low voltage power and graphic information) is concealed within the guide-rail assembly, and connects the LCD display to the laptop body.

This is an extremely simple mechanism that allows users to easily adjust the screen height. To operate, a user simply opens the laptop lid with a conventional latch, depresses the height adjustor button located either on the laptop body or on the screen assembly, allows the lid to slide to the desired height, and then releases the height adjustor button to lock the display in place. To close, the user may either depress the adjustor button and push the display to the lowest position and then swing the display shut, or because the guide-rail/pivot-hinge cannot be extended beyond itself, users may also close the lid and then retract the screen by pushing down on the extended part of the screen, without risking contact between the screen and the keyboard. The angle of the screen can be adjusted in the ordinary fashion.

Some variations are as follows.

Low voltage power and graphic information may be transmitted to the LCD via multiple metallic contact points concealed in the guide-rail assembly rather than a retracting cable.

As shown in laptop computer 3 in FIGS. 3-3E, the slide-up function may also be accomplished with dual guide-rail, pivot-hinge assemblies, one of which contains the flex-cable assembly.

The slide mechanism may be configured such that the display will automatically extend to a full-height position upon opening the laptop lid and self-close as the lid is returned to a closed position.

The laptop body may also be configured in a manner similar to the display, such that the keyboard may be slid towards the user upon pressing a button-controlled spring or telescoping-tube pneumatic adjustor similar to that used in the height adjustable LCD screen.

The display may also be configured to allow fore and aft movement via a secondary pivot hinge (tilt hinge) at the top of the guide-rail, allowing for even more adjustability.

EXAMPLE 2

A preferred example of a secondary pivot hinge to use in the invention is a pivot hinge requiring a limitation on the angle of rotation, to avoid the situation that beyond a limited range of motion (e.g., 30-45 degrees total range—15 to 22.5 degrees beyond the guide rail), the screen could overextend, thereby being damaged on closing. See the forward tilt limit to this range of motion in FIG. 2A, with the backswinging range approximately the same off from being aligned with the guide rail.

While the invention has been described in terms of its preferred embodiment, those skilled in the art will recognize that the invention can be practiced with modification within the spirit and scope of the appended claims.

What I claim as my invention is:

1. A display-adjusting assembly for a laptop computer comprising:
    an angle-able display which is vertically moveable along an extension axis, the extension axis having a minimum position at which the display is unextended and further having at least one extended position;
    exactly one single-rail extender mechanism on which, via which and/or due to which the display vertically moves along the extension axis; the single-rail extender mechanism and the display in an extended position establishing an angle;
    an angle adjustment mechanism, the angle between the single-rail extender mechanism and the display in an extended position being adjustable via operation of the angle adjustment mechanism;
    the display being slideably raisable and lowerable and held by a guide-rail; the guide-rail having attached thereto a pivot-hinge having a first end at which the pivot-hinge is attached to the guide-rail and a second end at which the pivot-hinge is attachable or attached to a laptop body;
    a secondary pivot-hinge having a first end attached to the guide rail and a second end attachable or attached to the display;
    an electrical connection between the display and the laptop body, said electrical connection being disposed within the guide-rail; and
    at least one button depressable by a user, depression of the button rendering the display slideable relative to the laptop body and/or rendering the laptop body horizontally slideable in a plane in which the laptop body sits.

* * * * *